US007624855B2

(12) United States Patent
Martocchio et al.

(10) Patent No.: US 7,624,855 B2
(45) Date of Patent: Dec. 1, 2009

(54) TRANSPORTING SYSTEM FOR PACKAGING MACHINE

(75) Inventors: Carmen V. Martocchio, Vernon, CT (US); John R. Rice, Suffield, CT (US)

(73) Assignee: Graphic West Packaging Machinery, LLC, Manchester, CT (US)

( * ) Notice: Subject to any disclaimer, the term of this patent is extended or adjusted under 35 U.S.C. 154(b) by 0 days.

(21) Appl. No.: 12/074,483

(22) Filed: Mar. 4, 2008

(65) Prior Publication Data

US 2009/0223180 A1 Sep. 10, 2009

(51) Int. Cl.
*B65G 15/00* (2006.01)

(52) U.S. Cl. ...................................... 198/405; 198/404

(58) Field of Classification Search ......... 198/401–407; 414/788.6, 789, 789.6, 790.6
See application file for complete search history.

(56) References Cited

U.S. PATENT DOCUMENTS

| | | | | |
|---|---|---|---|---|
| 3,593,624 | A * | 7/1971 | Dufour | 414/788.3 |
| 3,640,407 | A | 2/1972 | Anastasio et al. | |
| 3,859,898 | A * | 1/1975 | Besserdich et al. | 493/441 |
| 4,065,117 | A * | 12/1977 | Thorsheim | 270/52.02 |
| 4,161,095 | A | 7/1979 | Buday | |
| 4,264,255 | A * | 4/1981 | Saro et al. | 414/788.3 |
| 4,307,800 | A * | 12/1981 | Joa | 198/374 |
| 4,569,620 | A * | 2/1986 | Lynch | 412/21 |
| 5,078,260 | A * | 1/1992 | Bensberg et al. | 198/447 |
| 5,713,453 | A * | 2/1998 | Schornhorst et al. | 198/380 |
| 6,179,548 | B1 * | 1/2001 | Lukes et al. | 414/791 |
| 7,036,654 | B2 * | 5/2006 | Frost | 198/406 |

FOREIGN PATENT DOCUMENTS

EP 1564169 8/2005

* cited by examiner

*Primary Examiner*—Douglas A Hess
(74) *Attorney, Agent, or Firm*—Ira S. Dorman

(57) ABSTRACT

A transporting system in a packaging machine automatically merges and accumulates, usually as a shingled stream, generally flat articles having substantially continuous and discontinuous opposite sides, and includes a portion, of one of two main conveyor mechanisms, that is constructed to invert the articles, from side-to-side about endwise axes so that all of the cartons face upwardly, even though the articles of alternating groups have been inverted, during transport by that main conveyor mechanism, about their lateral axes.

8 Claims, 8 Drawing Sheets

PRIOR ART
FIG. 8
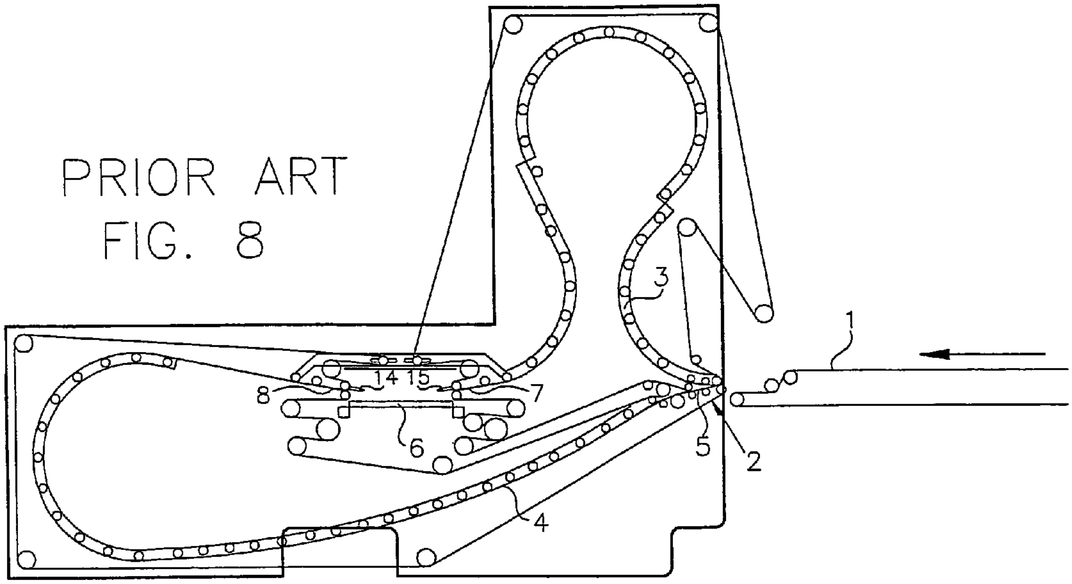
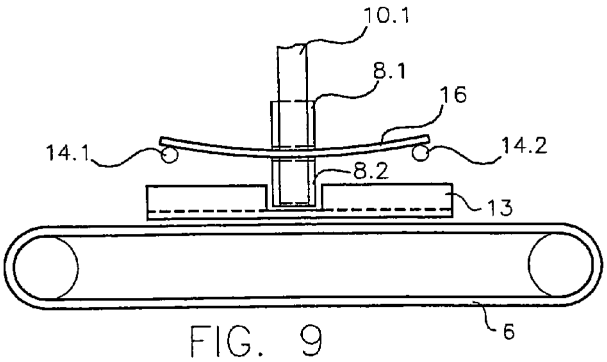
FIG. 9
PRIOR ART
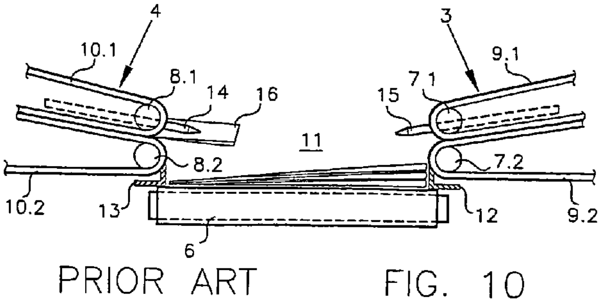
PRIOR ART FIG. 10

TRANSPORTING SYSTEM FOR PACKAGING MACHINE

BACKGROUND OF THE INVENTION

Folded and glued paperboard "lockbottom" or "autobottom" cartons (also know by other names, including "folded-bottom boxes") are generally flat as produced, but are characterized by having one edge portion that is much thicker than the opposite edge portion. The thicker edge portion (which normally forms the bottom part of the carton, when erected) consists of multiple plies (typically five) of the construction material, whereas the thinner edge portion (which normally comprises the cover) is typically of only one- or two-ply thickness. When a number of such cartons are stacked together with the same orientation, the resulting batch is of wedge-like form.

To accommodate that characteristic, lockbottom cartons are conventionally loaded into shipping cases as alternating batches of a multiplicity of cartons, arranged in opposite directions with the thicker end of one batch mated with, or complementary to, the thinner end of the adjacent batch. Doing so serves of course to most efficiently utilize the capacity of the shipping case while, at the same time, affording uniform weight distribution.

The systems for handling and loading such collapsed cartons are usually operatively connected directly to the machines by which they are folded and glued, from which they are presented as a shingled stream in which the thicker end portion of each carton is disposed as the leading edge with respect to the machine travel direction. As a practical matter, therefore, the packaging machines are also designed to handle cartons so oriented.

By way of further description, packaging of batches of lockbottom cartons, in an alternating arrangement, is depicted in FIG. 1 of the drawings; each carton is designated "C," the alternating batches of cartons (in this instance, consisting of five cartons) are designated "B" and "B'," and the corrugated shipping case (shown in broken line) contains a count of 60 cartons and is designated S. An individual carton C is also shown in FIG. 2, and a stacked batch B of ten cartons is shown in FIG. 3.

Machines for automatically transferring continuously arriving "folded-bottom boxes," to enable packaging as alternating batches in shipping cases, have previously been provided. One such machine is described in Bensberg et al. U.S. Pat. No. 5,078,260, and is depicted in FIGS. 8-10 of the appended drawings. Although, in most respects, the article-transfer system disclosed by Bensberg et al. is effective for its intended purposes, it nevertheless suffers from a fundamental deficiency, which in fact is believed to have rendered the system functionally and commercially unsuccessful.

That deficiency is indeed discussed in the passage beginning at line 16 in column 4 of the patent: "Since the alternating lay-off from the two conveyor mechanisms 3 and 4 makes its impossible to guide folded-bottom boxes 16, which have a tendency to hook onto one another, over the total lay-off area 11, the boxes are maintained at an angle to the direction of travel as they leave conveyor mechanisms 3 and 4 by rods 14.1 and 14.2 or 15." Although the rods provided do assist in reducing the "tendency to hook onto one another," they do not adequately solve the problem.

The reason why hooking (or catching, or interlocking) of cartons occurs during such automatic "overstocking" is illustrated in FIG. 4 of the appended drawings. When the cartons C (moving in the direction of the large, open arrow) arrive at the accumulation area, where they merge and accumulate as a shingled (or imbricated) stream, half are oriented with their relatively smooth, planar surfaces (hereinafter referred to for convenience as the "continuous" side) oriented upwardly (as seen for example in FIGS. 1-3), whereas the other half arrive in the inverted orientation shown in FIG. 4. When the continuous sides, generally designated by the numeral 15, face upwardly, successive cartons readily slide over one another, for trouble-free overstacking. In the inverted orientation, however, the upwardly facing side of the carton, generally designated by the numeral 25, is discontinuous, being comprised of panels that lie in at least two parallel planes and that present a free, generally transverse intermediate edge E at the intersection of the planes. When a deposited carton has its discontinuous side 25 facing upwardly, the leading edge of a successive carton will have a tendency to catch on, or interlock with, the exposed intermediate edge structure E of the underlying carton, as indicated by the three triangular marks in FIG. 4, usually necessitating stoppage of the entire production line when that occurs.

SUMMARY OF THE INVENTION

Accordingly, it is a broad object of the present invention to provide a transporting system, in a packaging machine, for automatically merging and accumulating substantially identical, but oppositely directed, generally flat articles (especially collapsed folded cartons) in such manner that a leading edge portion of an added article does not catch upon intermediate transverse edge structure present on an underlying article.

A more specific object of the invention is to provide such a transporting system in which conveying means functions to invert articles transported thereby so that they all arrive at a common accumulation location with a substantially continuous side of each article facing upwardly.

Another broad object of the invention is to provide a method for automatically merging and accumulating articles, of the construction described, whereby alternating groups of the articles are delivered to an accumulation location inverted end-to-end but with a substantially continuous side of each article facing upwardly.

As used herein, the word "article" refers to any object that is generally flat and that has the end portion and intermediate edge structure characteristics broadly described. An "article" will usually take the form of a lockbottom carton or the like, but other such objects (e.g., packages having receptacle components attached near one end of a backing board) are also contemplated. An assemblage of a plurality of articles having the same orientation (from side-to-side and from end-to-end) is referred to herein as a "batch," whereas the term "group" more broadly refers to a plurality of articles having such orientation but arranged either as a batch or as a consecutive sequence of individual articles.

It has now been found that certain of the foregoing and related objects of the invention are attained by the provision of a transporting system, for use in a packaging machine, for automatically merging and accumulating substantially identical, generally flat articles of the kind described, comprising first and second conveying means constructed for transporting the articles along separate paths from a common entrance location of the machine, at which all of the articles have the same, upwardly facing orientation, to a common accumulation location, the conveying means being so constructed as to maintain the articles transported with their endwise axes in alignment with the axis of travel. The first conveying means is so constructed and arranged as to deliver the articles to the accumulation location with the original orientation, whereas the second conveying means is so constructed and arranged as to deliver the articles to the accumulation location with an orientation in which they are inverted from the original orientation, end-to-end about transverse axes thereof, the first and second conveying means delivering the articles transported thereby to generally opposite sides of an upwardly facing support surface present at the accumulation location, for merging and accumulation, usually as a shingled stream. The machine also has diverting means at the entrance location, for presenting equal numbers of articles, as groups, alternatingly to the first and second conveying means for transport thereby. The second conveying means includes a portion that is so constructed as to invert the transported articles, from one side to the other about their endwise axes, so that, at the accumulation location, the substantially continuous sides of the articles face upwardly.

The inverting portion of the second conveying means is constructed to twist through an effective angle of substantially 180° about the axis of travel. The second conveying means may include at least three cooperating, separate sections, with the portion for inverting the articles comprising a section that is interposed between two others. The inverting section will preferably comprise at least one belt, assembled with support means that disposes two portions of the belt closely adjacent to one another for capturing the articles therebetween and for together traversing the two other sections; the inverting conveyor section will desirably comprise a single, endless belt.

In most instances the first conveying means will follow a path that has a substantial portion disposed above the level of the entrance location and the accumulation location (both elevated, but not necessarily at the same height) and the second conveying means will follow a path that has a substantial portion disposed therebelow. The travel axes of the first and second conveying means will normally be disposed substantially on a common vertical plane.

The machine will usually also include third conveying means disposed at the article-accumulation location and having a travel axis with a horizontal portion that extends substantially normal to the above-mentioned common vertical plane. The third conveying means will preferably provide the upwardly facing support surface on which the delivered articles are accumulated such that, with all of the conveying means in operation in appropriately timed relationships, the articles accumulate as a shingled stream, of alternating batches, on the support surface (generally, a belt or apron).

The terminal ends of the first and second conveying means will normally exit at the accumulation location at a level somewhat above the support surface, so that, upon exiting from the conveying means, the articles drop upon the support surface. The exits, or outlets, of the conveying means will usually also be so disposed that, as delivered, the leading end portions of the transported articles extend beyond lateral margins of the support surface, and over the proximal end portions of previously deposited articles, before they are released.

In certain preferred embodiments, the machine will additionally include a hold-down mechanism comprised of at least first and second contact members disposed, respectively, adjacent the generally opposite sides of the support surface at the common accumulation location. Broadly described, the hold-down mechanism will be constructed for moving the contact members, in alternating sequence, between a position proximate the support surface, for bearing upon the end portion of a deposited article, and a position displaced from the support surface for permitting the articles transported by presently discharging conveying means to exit therefrom, unimpeded. More specifically, each of the contact members will desirably comprise at least one brush, typically mounted for pivotal movement between the proximate and displaced positions. Depending upon the configuration of the article being packaged, it may for example be most advantageous to employ two wide brushes as contact members, mounted side-by-side in a laterally tandem relationship along each margin of the article-support surface.

Other objects of the invention are attained by the provision of a method for automatically merging and accumulating (usually as a shingled stream) substantially identical, generally flat articles of the nature described. The method broadly comprises the steps:

providing a multiplicity of articles at a common entrance location, all of the articles having the same, first orientation, taken end-to-end and also side-to-side, with a substantially continuous side facing generally upwardly;

delivering, by first conveying means, first groups of a plurality of the articles to one lateral side of an upwardly facing support surface, at a common accumulation location, with the articles having the first orientation;

delivering, by second conveying means, second groups of an equal number plurality of the articles to a generally opposite lateral side of the upwardly facing support surface at the accumulation location, with the articles having a second orientation in which they are reversed from the original orientation only end-to-end about their transverse axes and not reversed side-to-side about endwise axes thereof, deliveries of the groups of articles being so timed that a first group of the articles alternates with a second group, and that batches of articles merge and accumulate, usually as a shingled stream, so that, at the accumulation location, the discontinuous sides of all of the articles face the upwardly facing support surface and the substantially continuous sides face upwardly.

In most instances, the method of the invention will include a step of inverting the articles of the second groups, by use of the second conveying means, from one side to the other about endwise axes thereof. The articles employed in the method will usually be in the form of collapsed lockbottom folded cartons, or the like, in which the transversely extending thicker end portion is of multiply construction and constitutes the leading edge as the cartons are transported by the conveying means. The opposite, transversely extending thinner end portion (the trailing edge) will usually be of single-ply construction, or occasionally of double-play construction, and the leading edge:trailing edge thickness ratio will typically be 5:1 or 5:2, respectively.

By way of further, more detailed description, after exiting from a machine on which carton blanks are folded and glued, they arrive at the entrance to the transporting system as a shingled stream in which the cartons are overlapped with one another by a value that is typically about ten percent of their running-direction length; this is shown in FIG. 13. Needless to say, the infeed conveyor belt will be controlled to maintain a run speed that is consistent with the flow of incoming cartons. The shingled stream of cartons arriving at the entrance location is metered so that, in most instances, only individual cartons are then allowed to consecutively enter the transporting system, with a preselected variable (but uniform) gap between successive cartons (as seen in FIGS. 4 and 6), and suitable proximity sensors may be provided for controlling conveyor operation. Individual cartons are then transported by separate conveyor mechanisms in each of two directions, which may referred to as the "x-axis up" and the "x-axis down" directions (taken with reference to a common vertical plane, and as more fully discussed below); the paths defined by the two conveyor mechanisms are of equal length, and the conveyors run at the same speed.

With equal spacing between them, a preselected, variable number of individual cartons, constituting a group, are transported in the "x-axis up" direction. Immediately thereafter, an equal-number group of equally spaced individual cartons are transported in the "x-axis down" direction; subsequent groups are established and transported, in the same alternating manner.

The individual cartons arrive consecutively at a merge point at the terminal, exit ends of the two conveyors, at which is provided a third conveyor that runs perpendicular to the x-axis plane (as is also more fully discussed below). That y-axis conveyor operates at a controlled, variable speed and at a selected ratio to the x-axis conveyors (always more slowly); it serves for off-loading of the shingled stream of cartons, generally for deposit into a transport container (for which purpose the conveyor may have a z-axis portion as well).

As seen in FIG. 5 of the drawings, each of the cartons transported in the "x-axis up" direction (depicted therein, and indicated by the arrows) converges on the y-axis with the same orientation in which it entered the transporting system. As seen in FIG. 6, at the point that the individual cartons enter the y-axis conveyor (moving in the direction indicated) each of them overstacks, without difficulty, onto the previously deposited carton, thereby achieving a shingle value (overlap) that is typically 20 percent of the carton width.

Each of the individual cartons transported in the "x-axis down" direction (depicted in FIG. 7, and again indicated by open arrows) converges on the y-axis at an orientation that is rotated, end-for-end, 180° from the original orientation in which it entered the transporting system. As will be appreciated, and can be seen from FIG. 7, the original top sides of those cartons become the bottom sides as they are deposited at the accumulation location. It is because of the upward orientation of the discontinuous sides that a newly delivered carton will have a propensity to interlock with, or catch on, the previous carton and thereby produce the stacking problems noted; this is described above, with reference to FIG. 4.

BRIEF DESCRIPTION OF THE SEVERAL VIEWS OF THE DRAWINGS

FIGS. 8-10 are reproduced from the above-identified Bensberg et al. patent, presented therein as FIGS. 1-3, respectively, and illustrating the prior art;

DETAILED DESCRIPTION OF THE INVENTION

Figure 1:
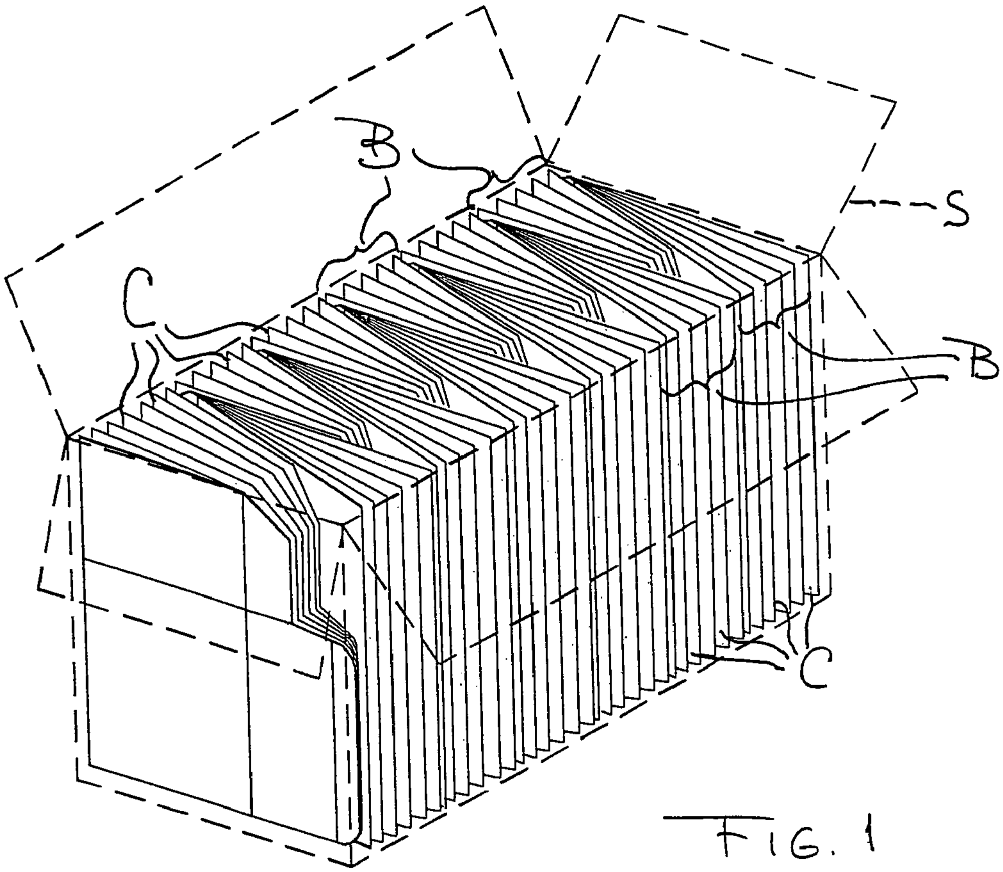
FIG. 1 is a perspective view showing (in broken line) a corrugated shipping case containing batches of folded cartons, arranged in an alternating mated relationship to one another and accommodating the wedge-shape form of the batches.
Figure 2:
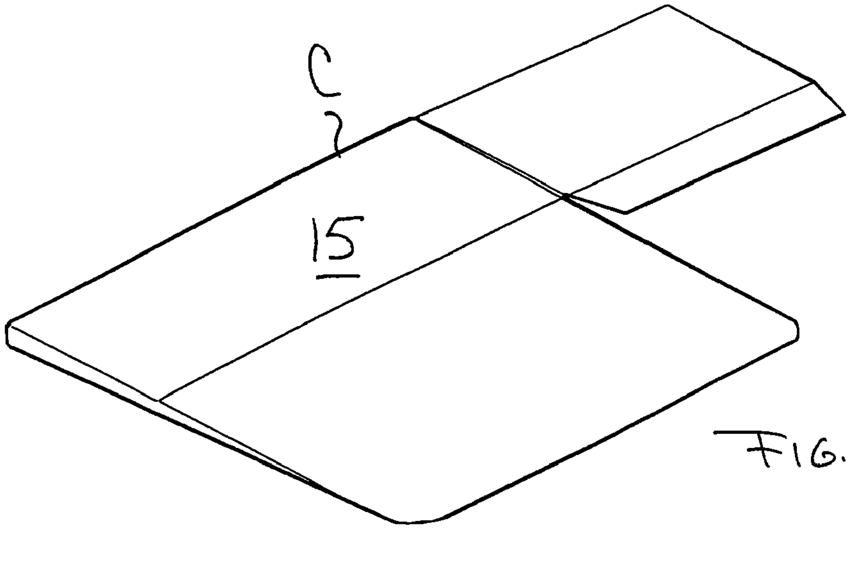
FIG. 2 is a perspective view of a single, generally flat carton for the transport of which the system of the present invention is particularly adapted.
Figure 3:
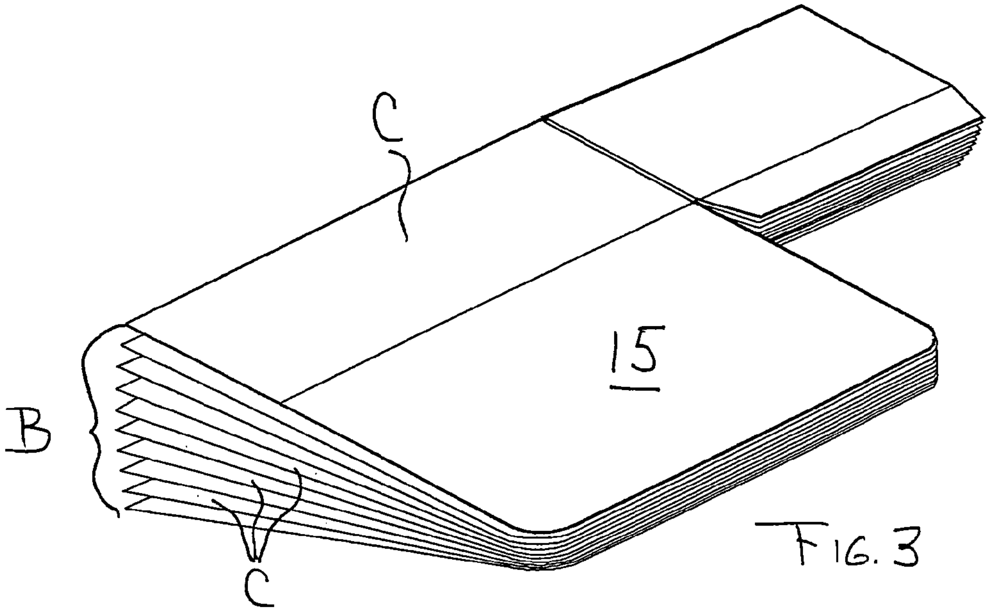
FIG. 3 is a perspective view of a batch of folded cartons showing the wedge-like form that is produced when they are stacked one upon another.
Figure 4:
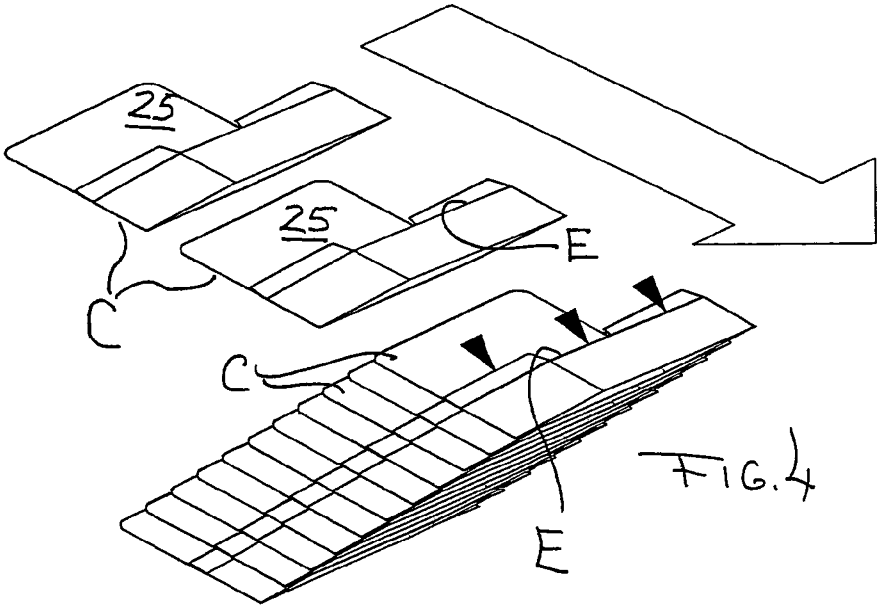
FIG. 4 is a perspective view showing cartons being delivered to a previously accumulated shingled stream of identical cartons, indicating points at which there is a propensity for catching, or interlocking, to occur.
Figure 5:
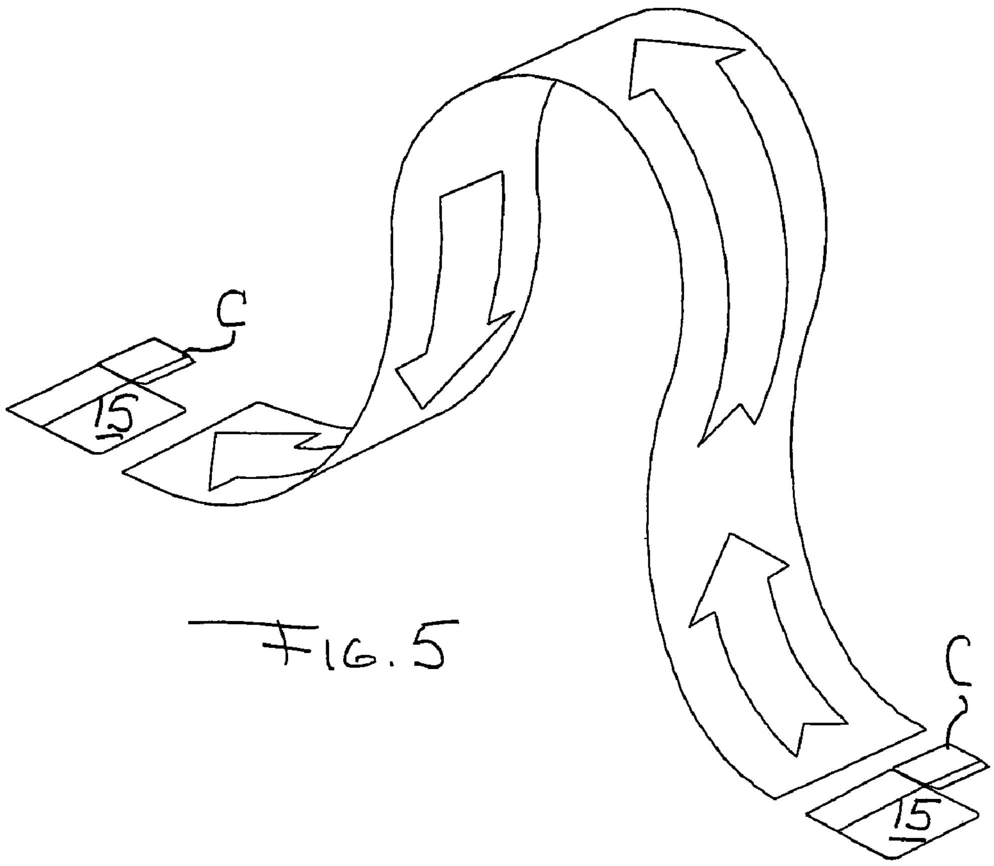
FIG. 5 is a schematic illustration showing an upward path followed by cartons from an entrance location of the transporting system to an accumulation location.
Figure 6:
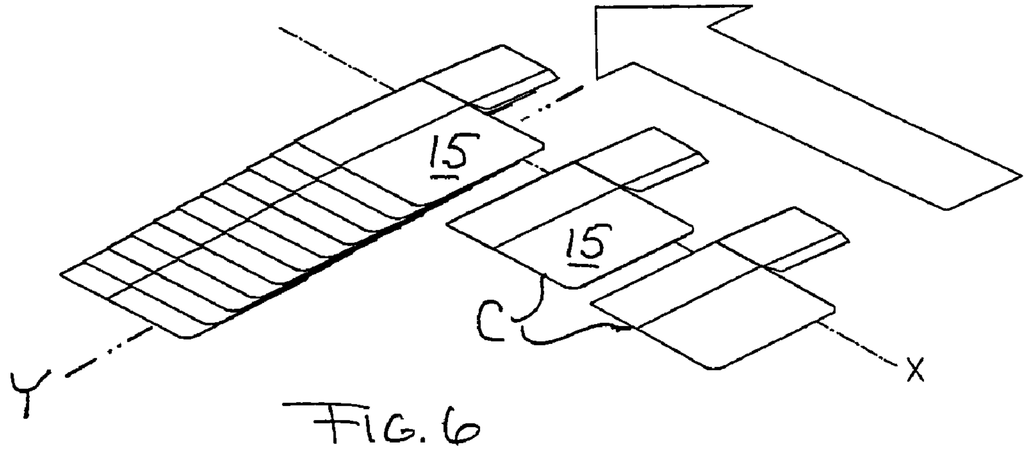
FIG. 6 is a perspective view showing the accumulation of cartons, as a shingled stream, with the substantially planar surface on the "continuous" side of the cartons disposed in an upwardly facing direction.
Figure 7:
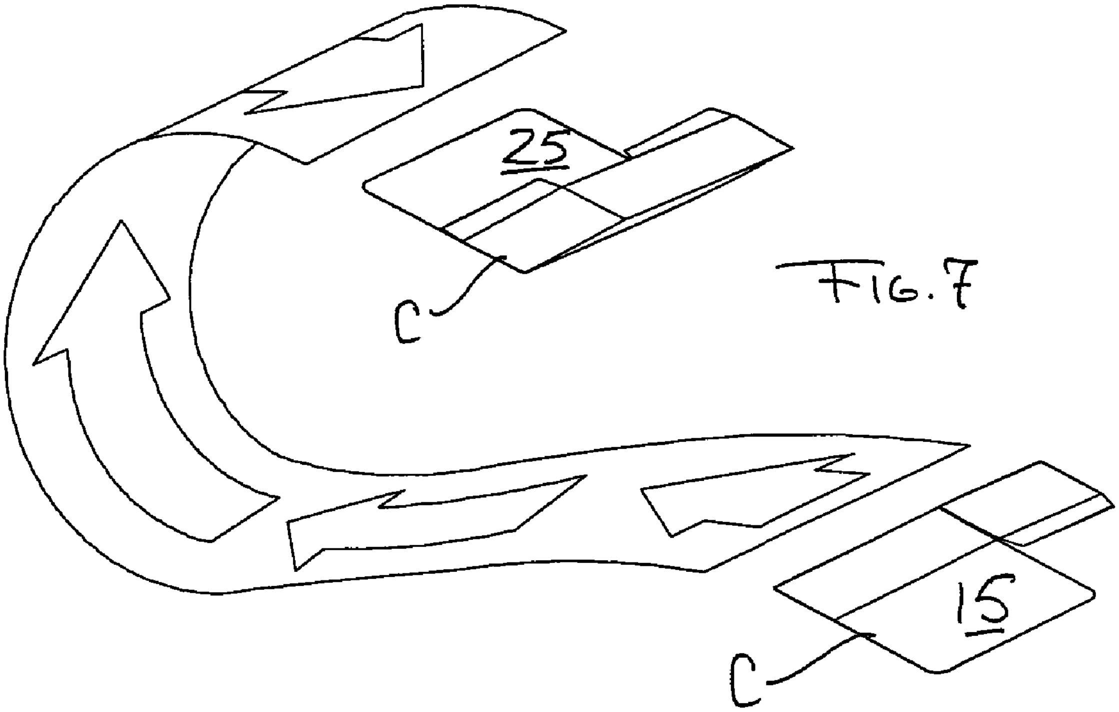
FIG. 7 is a view similar to FIG. 5, showing a downward path followed by cartons and delivered to an accumulation location, the cartons being inverted about a transverse axis, 180° from the orientation in which they entered the transporting system, and also showing that the substantially continuous side of the depicted carton has become downwardly directed with the discontinuous side facing upwardly.

Turning initially to FIGS. 8-10 of the drawings, marked "PRIOR ART," they are, as previously indicated, reproduced from the above-identified Bensberg et al. patent. As described therein, particularly at lines 1 through 60 of column 3 and with reference to the drawings thereof, incoming conveyor belt 1 extends from an unillustrated folded-box gluer to a transfer device 2 that distributes the incoming boxes to two different revolving conveyor mechanisms 3 and 4, each consisting of a top strand and a bottom strand. Between transfer device 2 and conveyor mechanisms 3 and 4 is a controlled baffle 5 that distributes the boxes alternately to each of the two conveyor mechanisms 3 and 4. A distributing baffle of this type is said to be known from German GM 8 717 500.

Conveyor mechanisms 3 and 4 extend vertically and terminate on each side of and slightly above a horizontal conveyor belt 6 that branches off at approximately the same level as incoming conveyor belt 1 and leads to an unillustrated packing machine. Lower conveyor mechanism 4 extends below conveyor belt 6, through a 180° curve, and back to just above the belt. Upper conveyor mechanism 3 extends, without rotating the boxes, straight to transverse conveyor belt 6 and terminates on the other side of the belt at approximately the same level as lower conveyor mechanism 4. To ensure that both conveyor mechanisms 3 and 4 will convey the boxes to the same extent, conveyor mechanism 3 has a compensation loop. Transverse conveyor belt 6, which is a revolving-belt conveyor, leads to an unillustrated machine that packs the boxes in shipping cartons.

FIGS. 9 and 10 are larger-scale illustrations of the vicinity of the end of conveyor mechanisms 3 and 4 and transverse conveyor belt 6. The pulleys 7.1 and 7.2, and 8.1 and 8.2, on belts 9.1, 9.2 and 10.1, 10.2, respectively, which constitute the end of conveyor mechanisms 3 and 4, are located on each side of and slightly above transverse conveyor belt 6. They can be moved closer to or farther away from each other to adjust the lay-off area 11 between them to different-length folding boxes. Below lower pulleys 7.2 and 8.2 and above transverse conveyor belt 6 are two lateral stops 12 and 13, which are also adjustable. Away from the side of belts 9 and 10, parallel to them, slightly above the lower strand of each upper belt 9.1 and 10.1, and at the end of each conveyor mechanism 3 and 4 are two vertical rods 14 and 15 that extend into lay-off area 11. Rods 14 and 15 force the lateral edges of folding boxes 16 up as they leave conveyor mechanisms 3 and 4 and enter lay-off area 11. This procedure stabilizes them along the direction of travel, preventing the downstream end of each box from tipping down once it is no longer being positioned by belts 9 and 10.

Another embodiment employs, instead of rods 14 and 15, vertical guide rollers on each side of outlet-end pulleys 7 and 8 to force the lateral edges of the boxes up. The circumference of the guide rollers extends to slightly above the lower strand of upper belt 9.1 and 10.1. This relationship can be attained for example by guide rollers with a slightly longer diameter positioned coaxially with outlet-end pulleys 7.1 and 8.1.

Operation of the Bensberg et al. machine is described, at line 63 of column 3 through line 31 of column 4 of the patent, as follows: Incoming conveyor belt 1 constantly supplies an overlapping stream of boxes to transfer device 2 from the assembly and pressure-application mechanism of a folded-bottom box gluer. The folded bottoms of boxes 16 are downstream and their tops upstream and up. A specific number (e.g. ten) of folding boxes 16 are obtained from the overlapping stream backed up upstream of transfer device 2 and supplied individually and following one another separated to one of the two conveyor mechanisms 3 and 4 by distributing baffle 5. Once the prescribed number has been supplied, distributing baffle 5 shifts to the other conveyor mechanism 4 or 3. The result is a continuous overlapping stream on transverse conveyor belt 6. This stream is automatically packed in shipping cartons by an unillustrated packing machine.

The Bensberg disclosure goes on to explain that, since the folding boxes 16 laid off on transverse conveyor belt 6 by lower conveyor mechanism 4 are rotated 180°, in relation to the boxes supplied by conveyor mechanism 3, the boxes are always laid off with their thicker end, constituted by the bottom of the box, on different sides of transverse conveyor belt 6. Since the alternating lay-off from the two conveyor mechanisms 3 and 4 makes it impossible to guide folded-bottom boxes 16, which have a tendency to hook onto one another, over the total lay-off area 11, the boxes are maintained at an angle to the direction of travel as they leave conveyor mechanisms 3 and 4 by rods 14.1 and 14.2 or 15. The angle to the direction of travel stabilizes the boxes to the extent that they can be continuously laid off one on top of another with no problems. Stabilization is in particular necessary for the folding-bottom boxes 16 supplied by lower conveyor mechanism 4, which are finally secured only at the top as they leave belts 10.1 and 10.2 and must be supplied with an additional impetus by the upper sides of the boxes downstream of them.

Turning now in detail to FIGS. 11-14 of the drawings, therein illustrated is an article-transporting system embodying the present invention, constituting an improvement upon the transferring device described in the Bensberg et al. patent, discussed above. Except where indicated otherwise, expressly or by context, the present system incorporates the features of the Bensberg et al. device, and the present specification incorporates, by reference, the disclosure of the Bensberg et al. patent.

The illustrated system includes an infeed conveyor section, generally designated by the numeral 30 and providing an entrance support area 32, and an upper conveyor mechanism generally designated by the numeral 34. The infeed conveyor section 32 effectively constitutes part of the lower conveyor mechanism, which additionally includes an inverting section, generally designated by the numeral 36, and a curved delivery section, generally designated by the numeral 38. Albeit important that the articles be adequately captured for reliable transport, it will be appreciated that the conveyors employed in the system can take any suitable form, as will be evident to those skilled in the art. Thus, sets of belts, such as belts 21, 23, 27, 29, 31 shown in FIG. 11, trained over suitable pulleys and rollers 33, 35, may be employed to provide underlying and overlying support. Alternatively, conveyors with edge-clamping mechanisms might be suitable in certain instances. Similarly, any suitable distribution device 5 can be employed in the present system for directing the articles alternatively to the upper and lower conveyor mechanisms. As an alternative to the controlled baffle referred to by Bensberg et al., it may, for example, take the form of a conveyor section that moves between raised and lowered positions.

Figure 11:
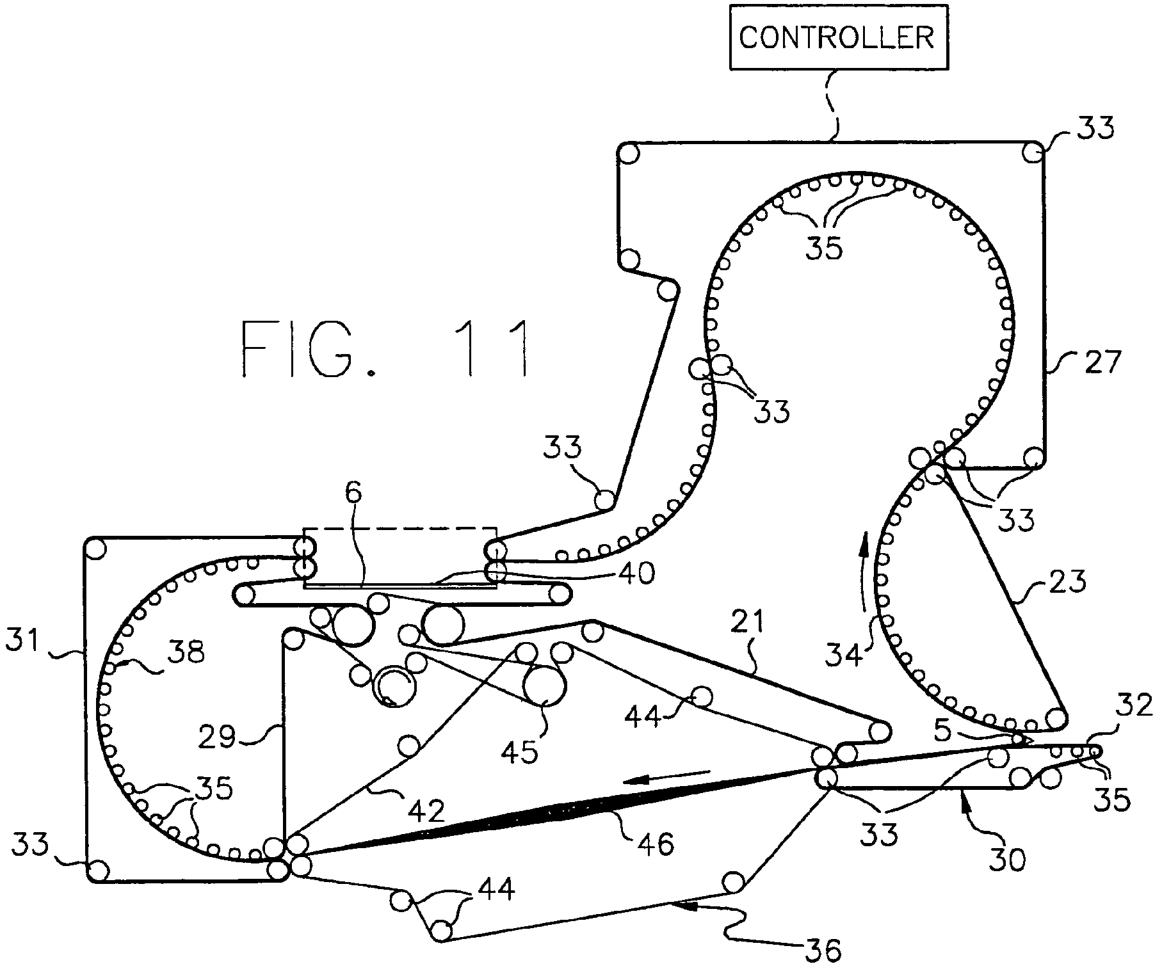
FIG. 11 is a schematic illustration showing the transporting system of the present invention.

As can be seen, both the upper conveyor mechanism 34 and the delivery section 38 of the lower conveyor mechanism lead to a merge and accumulation location, at which is provided a transverse outfeed conveyor 6 that provides a normally horizontal, belt or apron accumulation surface 40. It will be appreciated that both the upper and lower conveyor mechanisms have travel directions that lie generally on a common vertical plane (i.e., the plane of the page on which FIG. 11 is presented) containing “x-axis up” and “x-axis down” directions of the two main conveyor mechanisms, and that the outfeed conveyor 6 has a travel direction that is normal to the common vertical plane (i.e., normal to the drawing page), on a y-direction axis. It will also be appreciated that, apart from the inverting conveyor section 36, and the features necessary to accommodate it and its functions, the transporting system depicted in FIG. 11 is functionally equivalent to the arrangement described in the Bensberg et al. patent. It will also be appreciated that the system will include suitable drive means (not shown), with all operations being controlled automatically and variably by suitable means (i.e., an operatively connected controller, normally computerized and having conventional terminals, data entry peripherals, etc.) known to those skilled in the art.

Figure 12:
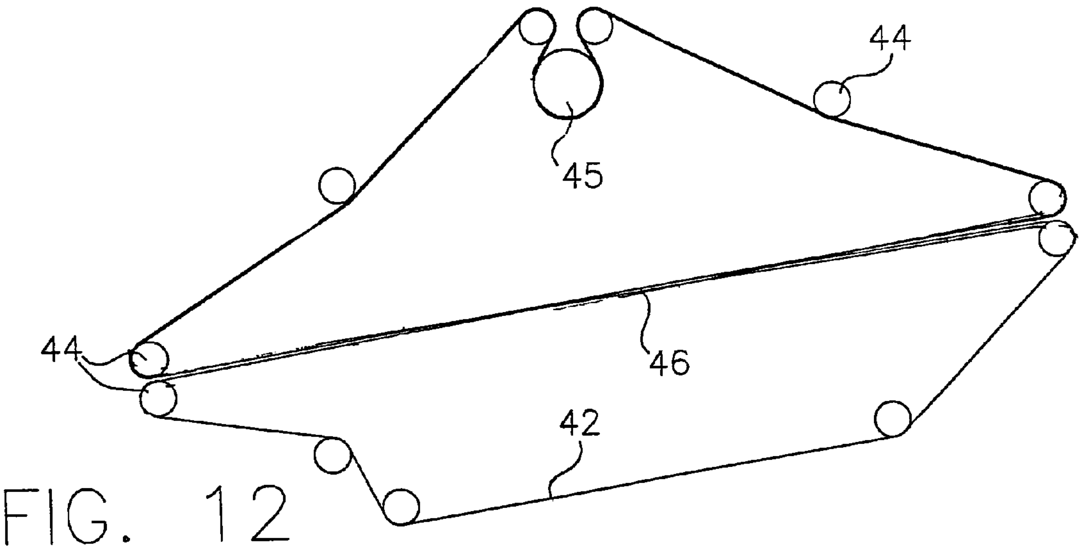
FIG. 12 is a schematic illustration, drawn to a scale enlarged from that of FIG. 11, showing the inverting section of the lower conveyor mechanism utilized in the illustrated embodiment of the system of the invention.

As can be seen in FIGS. 11 and 12, the inverting section 36 of the lower conveyor mechanism comprises a single endless belt 42, which is trained over pulleys, or guide rollers, 44 and driven through engagement with a gear 45 (operatively connected to a motor, not shown), or other suitable element, constituting components of a supporting structure. The belt 42 follows a path through the inverting section, and provides two cooperating portions that together traverse the space between the infeed conveyor section 30 and the delivery conveyor section 38.

The feature of the conveyor means, here taking the form of belt 42, that is essential to the invention resides in the twist area 46 at which the contiguous portions of the belt act together to effectively turn through an angle of 180° (which may involve, for example, a number of 90° or 180° twists, formed prior to joining the opposite ends of a single strand), in traversing the space between the sections 30 and 38, taken with respect to the travel direction axis of the conveyor; there are belt crossover and crossback points along the span. In this manner the articles (not shown in FIGS. 11 and 12), which are captured between the two contiguous portions of the endless belt 42, are inverted about their endwise axes, which are aligned in the travel direction of the conveyor; the belt 42 may be wider than the belts used for the other conveyors to most effectively achieve that function. In any event, and as a result, articles conveyed by the lower conveyor mechanism arrive at the accumulation location, for deposit on the conveyor surface 40, with their substantially continuous sides 15 facing upwardly, thereby avoiding the interference and catching that would occur if the discontinuous sides 25 were so directed.

It will be appreciated that, in the prior art system, the lower conveyor mechanism reorients the cartons by effectively inverting them simultaneously both end-to-end (i.e., by making the leading end portion the trailing end portion) and also side-to-side (i.e., by turning them over). The twist of the belt portions of the illustrated embodiment of the present system effectively reinverts the cartons about their endwise axes to product the final orientation desired; i.e., with the groups alternating and with the continuous sides of all of the cartons facing upwardly at the accumulation location.

Figure 13:
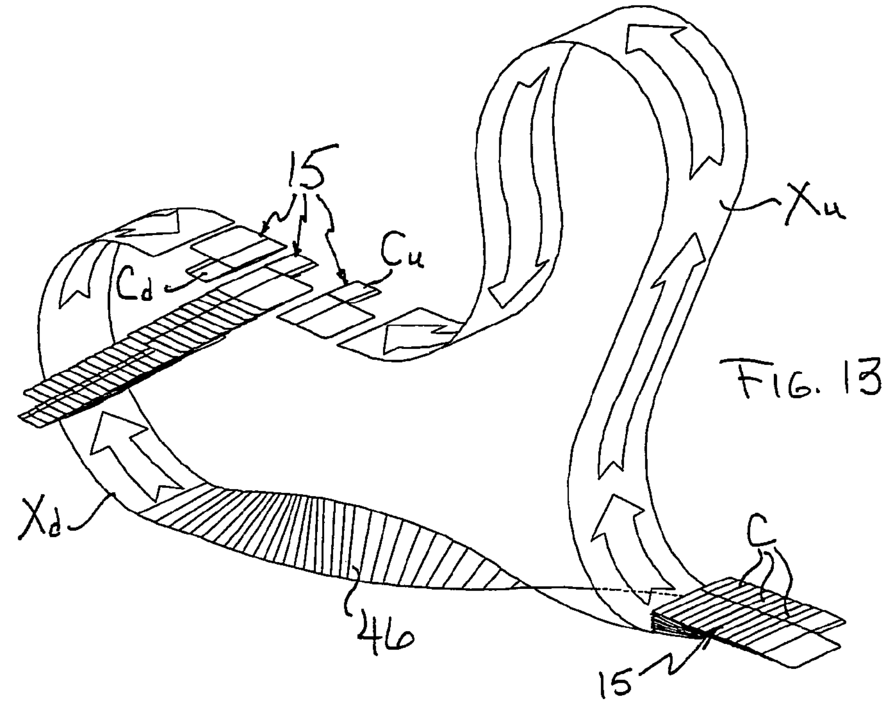
FIG. 13 is a schematic illustration showing the paths along which the cartons are transported in accordance with the illustrated embodiment.

These relationships are diagrammatically illustrated in FIG. 13. As can be seen, a shingled stream of overlapped cartons are presented for transport along the upper conveyor path $X_u$ (x-axis up) and lower conveyor path $X_d$ (x-axis down) in alternating groups. While all of the cartons arrive at the accumulation location with the coplanar panel surfaces (substantially continuous side) facing upwardly (as in the original presentation), the cartons $C_u$, conveyed along the upper path $X_u$, maintain the original orientation whereas the articles $C_d$, conveyed along the lower travel path $X_d$, arrive with an orientation that is inverted about a transverse axis. The shingled batches of cartons B, B' are outfed from the accumulation location along the perpendicular axis y.

Figure 14:
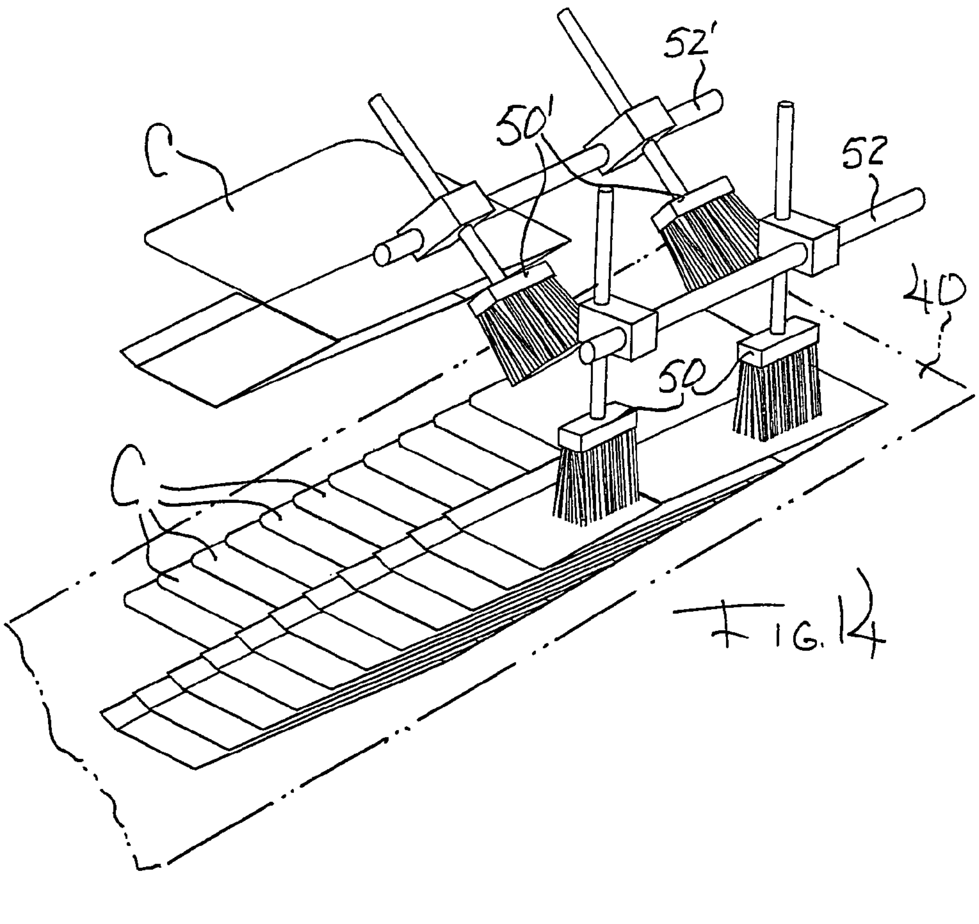
FIG. 14 is a perspective view showing a hold-down mechanism desirably employed in the system of the invention.

Turning finally to FIG. 14 of the drawings, therein illustrated is a hold-down mechanism mounted between the exit ends of the two x-axis conveyor mechanisms 34, 38 (not shown) and over the accumulation surface 40 (shown in phantom line). The mechanism includes two pairs of brushes 50, 50', the members 50 of one pair being mounted in tandem upon a common shaft 52, adjacent the exit of the x-axis up conveyor mechanism 34, and the members 50' being mounted in tandem upon a common shaft 52' adjacent the exit of the x-axis down conveyor section 38. At the stage of operation illustrated, the x-axis up brushes 50 are pivoted to a lowered position, proximate the accumulation surface 40, so as to bear downwardly upon the cartons C delivered from the x-axis down conveyor section 38 and accumulated thereat while, at the same time, permitting them to pass readily thereunder; the x-axis down brushes 50' are pivoted upwardly away from the accumulation surface 40, so as to permit cartons to pass thereto, unimpeded, from the conveyor section 38. When, at the next stage of operation, the first of a successive group of cartons is presented to the accumulation surface from the x-axis up conveyor mechanism 34, the brushes 50 pivot upwardly, out of the way, and the x-axis down brushes 50' pivot downwardly into their operative position (again, bearing upon the thicker, leading edge portions of the cartons). Needless to say, forms of contact members other than brushes may be employed (e.g., flexible resilient elements of synthetic foamed material), and the means for positioning them may of course vary (acting, for example, by translational, rather than rotary, motion).

Thus, it can be seen that the present invention provides a system for automatically merging and accumulating a multiplicity of substantially identical, generally flat articles (especially folded cartons) as oppositely directed batches and in such manner that a leading edge portion of an article, added to a preexisting shingled stream (or on top of a single previously deposited article), does not catch upon an exposed intermediate edge portion of an underlying article. More particularly, the invention provides a trans-porting system wherein conveying means provided functions to invert articles transported thereby so that all of the articles arrive at the common accumulation area of the machine with the substantially continuous sides of the articles facing upwardly. The invention also provides a method for automatically merging and accumulating a multiplicity of articles of the construction described, whereby the articles are delivered to an accumulation location with an optimal orientation.

Having thus described the invention, what is claimed is:

1. In a machine for automatically packaging substantially identical, generally flat articles, each article being comprised of a plurality of panels and having a first, substantially continuous side and a second, discontinuous opposite side, the panels having surfaces on the continuous side of the article that lie substantially only in a common plane and having surfaces on the discontinuous side of the article that lie substantially in at least two generally parallel planes, each of the articles having opposite end portions that extend transversely with respect to an endwise axis, one of the end portions being substantially thicker than the other, and each article also having edge structure that extends transversely between the opposite end portions on the discontinuous side and at an intersection of the at least two planes; said machine including a transporting system for merging and accumulating the articles, said system comprising first and second conveying means, said conveying means being constructed for transporting the articles on respective axes of travel along separate paths from a common entrance location, at which all of the articles have the same, first orientation, end-to-end and side-to-side, with their continuous sides directed upwardly, to a common accumulation location of the machine at which is provided an upwardly facing support surface, each of said conveying means being constructed to maintain the articles transported thereby with their endwise axes in alignment with said axis of travel thereof, said first conveying means being so constructed and arranged as to deliver the articles to said accumulation location with the first orientation, and said second conveying means being so constructed and arranged as to deliver the articles to said accumulation location with a second orientation in which the articles are inverted from the first orientation, end-to-end about transverse axes thereof, said first and second conveying means delivering the articles transported thereby to generally opposite lateral sides of said accumulation location for merging and accumulation as a shingled stream on said support surface; said machine also having diverting means at said entrance location for presenting equal numbers of articles, as groups, alternatingly to said first and second conveying means for transport thereby; said second conveying means including an inverting portion that is so constructed as to invert the articles transported thereby, from one side to the other about the endwise axes thereof so that, at said accumulation location, the discontinuous sides of all of the articles face said upwardly facing support surface and the continuous sides thereof are upwardly directed, said inverting portion of said second conveying means being constructed to twist through an effective angle of substantially 180° about said axis of travel of said second conveying means, and said second conveying means including at least three cooperating, separate sections, said inverting portion comprising an inverting section interposed between two other of said sections.

2. The machine of claim 1 wherein said inverting section comprises at least one belt, and support means disposing two portions of said at least one belt closely adjacent to one another for capturing the articles therebetween and for together traversing the space between said two other sections.

3. The machine of claim 2 said inverting section comprises a single, endless belt.

4. The machine of claim 1 wherein said common locations are disposed at elevated levels, and wherein said first conveying means follows a generally upward path, from said entrance location, that has a substantial portion disposed above said levels, and wherein said second conveying means follows a generally downward path, from said entrance location, that has a substantial portion disposed below said levels.

5. The machine of claim 1 additionally including means for automatically controlling the operation of said conveying means.

6. In a machine for automatically packaging substantially identical, generally flat articles, each article being comprised of a plurality of panels and having a first, substantially continuous side and a second, discontinuous opposite side, the panels having surfaces on the continuous side of the article that lie substantially only in a common plane and having surfaces on the discontinuous side of the article that lie substantially in at least two generally parallel planes, each of the articles having opposite end portions that extend transversely with respect to an endwise axis, one of the end portions being substantially thicker than the other, and each article also having edge structure that extends transversely between the opposite end portions on the discontinuous side and at an intersection of the at least two planes; said machine including a transporting system for merging and accumulating the articles, said system comprising first and second conveying means, said conveying means being constructed for transporting the articles on respective axes of travel along separate paths from a common entrance location, at which all of the articles have the same, first orientation, end-to-end and side-to-side, with their continuous sides directed upwardly, to a common accumulation location of the machine at which is provided an upwardly facing support surface, each of said conveying means being constructed to maintain the articles transported thereby with their endwise axes in alignment with said axis of travel thereof, said first conveying means being so constructed and arranged as to deliver the articles to said accumulation location with the first orientation, and said second conveying means being so constructed and arranged as to deliver the articles to said accumulation location with a second orientation in which the articles are inverted from the first orientation, end-to-end about transverse axes thereof, said first and second conveying means delivering the articles transported thereby to generally opposite lateral sides of said accumulation location for merging and accumulation as a shingled stream on said support surface; said machine also having diverting means at said entrance location for presenting equal numbers of articles, as groups, alternatingly to said first and second conveying means for transport thereby; said second conveying means including an inverting portion that is so constructed as to invert the articles transported thereby, from one side to the other about the endwise axes thereof so that, at said accumulation location, the discontinuous sides of all of the articles face said upwardly facing support surface and the continuous sides thereof are upwardly directed, said travel axes of said first and second conveying means being disposed substantially on a common vertical plane, and said transporting system additionally including third conveying means disposed at said common accumulation location and having a travel axis that has at least a horizontal portion that extends substantially normal to said common vertical plane on which said travel axes of said first and second conveying means are disposed, said third conveying means providing said support surface on which the delivered articles are accumulated such that, with all of said conveying means in operation in properly timed relationships, the articles accumulate as a shingled stream on said support surface.

7. In a machine for automatically packaging substantially identical, generally flat articles, each article being comprised of a plurality of panels and having a first, substantially continuous side and a second, discontinuous opposite side, the panels having surfaces on the continuous side of the article that lie substantially only in a common plane and having surfaces on the discontinuous side of the article that lie substantially in at least two generally parallel planes, each of the articles having opposite end portions that extend transversely with respect to an endwise axis, one of the end portions being substantially thicker than the other, and each article also having edge structure that extends transversely between the opposite end portions on the discontinuous side and at an intersection of the at least two planes; said machine including a transporting system for merging and accumulating the articles, said system comprising first and second conveying means, said conveying means being constructed for transporting the articles on respective axes of travel along separate paths from a common entrance location, at which all of the articles have the same, first orientation, end-to-end and side-to-side, with their continuous sides directed upwardly, to a common accumulation location of the machine at which is provided an upwardly facing support surface, each of said conveying means being constructed to maintain the articles transported thereby with their endwise axes in alignment with said axis of travel thereof, said first conveying means being so constructed and arranged as to deliver the articles to said accumulation location with the first orientation, and said second conveying means being so constructed and arranged as to deliver the articles to said accumulation location with a second orientation in which the articles are inverted from the first orientation, end-to-end about transverse axes thereof, said first and second conveying means delivering the articles transported thereby to generally opposite lateral sides of said accumulation location for merging and accumulation as a shingled stream on said support surface; said machine also having diverting means at said entrance location for presenting equal numbers of articles, as groups, alternatingly to said first and second conveying means for transport thereby; said second conveying means including an inverting portion that is so constructed as to invert the articles transported thereby, from one side to the other about the endwise axes thereof so that, at said accumulation location, the discontinuous sides of all of the articles face said upwardly facing support surface and the continuous sides thereof are upwardly directed, said first and second conveying means having terminal exits at said accumulation location, said terminal exits being disposed above the level of said support surface so that, upon exiting from said first and second conveying means the articles drop upon said support surface, said terminal exits of said first and second conveying means being so disposed that the leading end portions of the articles extend beyond lateral margins of said support surface, and over end portions of previously deposited articles, before they are released by said conveying means, said system additionally including a hold-down mechanism comprised of at least first and second contact members disposed, respectively, adjacent said generally opposite sides of said support surface at said common accumulation location, said hold-down mechanism being constructed for moving, in alternating sequence, each of said first and second contact members between a position thereof proximate said support surface, for bearing upon the end portion of an article deposited upon said support surface, and a position displaced from said support surface for permitting the articles transported by said conveying means, adjacent thereto, to pass from said terminal exit thereof, unimpeded.

8. The machine of claim 7 wherein each of said contact members comprises at least one brush, and wherein said contact members are mounted for pivotal movement between said proximate and displaced positions.

* * * * *